US012794251B2

(12) United States Patent
Chu

(10) Patent No.: US 12,794,251 B2
(45) Date of Patent: Nov. 10, 2026

(54) POWER SUPPLY SYSTEM

(71) Applicant: FSP TECHNOLOGY INC., Taoyuan City (TW)

(72) Inventor: Ting-Chuan Chu, Taoyuan City (TW)

(73) Assignee: FSP TECHNOLOGY INC., Taoyuan City (TW)

( * ) Notice: Subject to any disclaimer, the term of this patent is extended or adjusted under 35 U.S.C. 154(b) by 758 days.

(21) Appl. No.: 18/330,015

(22) Filed: Jun. 6, 2023

(65) Prior Publication Data

US 2023/0402861 A1 Dec. 14, 2023

(30) Foreign Application Priority Data

Jun. 9, 2022 (TW) ................................. 111121488

(51) Int. Cl.

*H02M 3/00* (2006.01)
*H02J 7/40* (2026.01)
*H02J 7/70* (2026.01)
*H02M 7/00* (2006.01)

(52) U.S. Cl.

CPC ................ *H02J 7/70* (2026.01); *H02J 7/40* (2026.01); *H02M 3/003* (2021.05); *H02M 7/003* (2013.01)

(58) Field of Classification Search

CPC ........................................................ H02J 7/70
USPC ........................................................ 320/107
See application file for complete search history.

(56) References Cited

U.S. PATENT DOCUMENTS

| | | | | |
|---|---|---|---|---|
| 11,586,271 | B1 * | 2/2023 | Kadam | G06F 1/26 |
| 2020/0303939 | A1 * | 9/2020 | Perry | H02J 7/02 |
| 2021/0083500 | A1 * | 3/2021 | Quek | H02J 1/106 |
| 2021/0167623 | A1 * | 6/2021 | Sanghvi | H02J 7/575 |
| 2021/0351716 | A1 * | 11/2021 | Richards | H02M 3/33523 |

* cited by examiner

*Primary Examiner* — Ahmed H Omar
(74) *Attorney, Agent, or Firm* — MUNCY, GEISSLER, OLDS & LOWE, P.C.

(57) ABSTRACT

A power supply system includes a distribution box and a plurality of charging sockets. The distribution box includes a power delivery charging apparatus. The charging sockets are electrically connected to the power delivery charging apparatus. The charging socket transmits a load power information to the power delivery charging apparatus, and the power delivery charging apparatus provides a DC power to the charging socket according to the load power information.

10 Claims, 5 Drawing Sheets

POWER SUPPLY SYSTEM

BACKGROUND

Technical Field

The present disclosure relates to a power supply system, and more particularly to power supply system with high power output.

Description of Related Art

The statements in this section merely provide background information related to the present disclosure and do not necessarily constitute prior art.

The existing embedded USB charging socket includes a USB socket and its electrical connection to the power converter. Users only need to plug the USB charging cable into the wall USB socket to charge the electronic products.

However, since the embedded USB charging socket is limited by its volume specification, its power converter may only output low-power DC power to the USB socket. In other words, the embedded USB charging socket may only output DC power of 5 volts, which is used to charge electronic products with low power requirements, such as but not limited to mobile phones, tablet computers, digital cameras, etc. Compared with this, for electronic products with high power requirements, such as but not limited to notebook computers, monitors, etc., it is still necessary to use a charger to connect to an AC socket. Therefore, the embedded USB charging socket still cannot be widely used on various electronic products.

Accordingly, how to design a kind of power supply system to solve the existing problems and technical bottlenecks of the related art is an important topic studied by the inventor of the present disclosure.

SUMMARY

An objective of the present disclosure is to provide a power supply system to solve the existing problems.

In order to achieve the above-mentioned objective, the power supply system of the present disclosure includes a distribution box and a plurality of charging sockets. The distribution box includes a power delivery charging apparatus. The plurality of plurality of charging sockets are electrically connected to the power delivery charging apparatus. The charging socket transmits a load power information to the power delivery charging apparatus, and the power delivery charging apparatus provides a DC power to the charging socket according to the load power information.

In one embodiment, the power delivery charging apparatus includes an AC/DC module, a communication module, and a controller. The AC/DC module receives an AC mains, converts the AC mains into the DC power, and provides the DC power to the charging socket. The communication module receives the load power information, and transmits the load power information to a controller. The controller receives the load power information, and converts the load power information into corresponding control signals to the communication module, and the communication module transmits the control signals to the corresponding charging sockets.

In one embodiment, the AC/DC module converts the AC mains into a control power to provide the power required by the controller.

In one embodiment, the AC/DC module converts the AC mains into a first communication power to provide the power required by the communication module.

In one embodiment, the communication module transmits the control signals to the corresponding charging sockets by means of wired communication or wireless communication.

In one embodiment, each charging socket supports the power transmission function.

In one embodiment, each charging socket includes a USB socket and a DC/DC module. The USB socket connects to a load, and receives a load power corresponding to the load power information provided by the load. The DC/DC module receives the load power, and transmits the load power information corresponding to the load power to the power delivery charging apparatus.

In one embodiment, the DC/DC module includes a detection circuit, a communication circuit, and a DC/DC conversion circuit. The detection circuit receives the load power, and converts the load power into the load power information. The communication circuit receives the load power information and a control signal transmitted by the power delivery charging apparatus, and transmits the load power information to the power delivery charging apparatus. The DC/DC conversion circuit receives the DC power and to be supplied power, and converts the DC power into an output power according to the control signal to provide the power required by the load.

In one embodiment, the load power is a voltage, a current, or a power.

In one embodiment, the output power is a DC voltage, and the DC voltage is 5 volts, 9 volts, 15 volts, 20 volts, 28 volts, 36 volts, or 48 volts.

In one embodiment, the distribution box is installed in a building, and the charging sockets are respectively installed in different spaces in the building. The distribution box is connected to the charging sockets through wire arrangement.

Accordingly, the present disclosure has the following features and advantages: 1. The power supply system of the present disclosure is a power supply system that can provide high-power output, which can not only meet the charging of electronic products with low power requirements, but also realize the charging of electronic products with high power requirements. Therefore, the embedded USB charging socket with limited volume can be widely used on various electronic products. 2. Each of the charging sockets 20-1, 20-2, . . . , 20-N of the present disclosure supports the power delivery (PD) function, and can realize the PD fast charging function through the Type-C transmission charging cable. 3. In the present disclosure, the AC/DC module with large electromagnetic interference is independently arranged in the distribution box, and the DC/DC module with small electromagnetic interference is arranged at the charging socket end so as to effectively solve the application fields with strict requirements on electromagnetic wave interference, such as medical institutions.

It is to be understood that both the foregoing general description and the following detailed description are exemplary, and are intended to provide further explanation of the present disclosure as claimed. Other advantages and features of the present disclosure will be apparent from the following description, drawings, and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1:
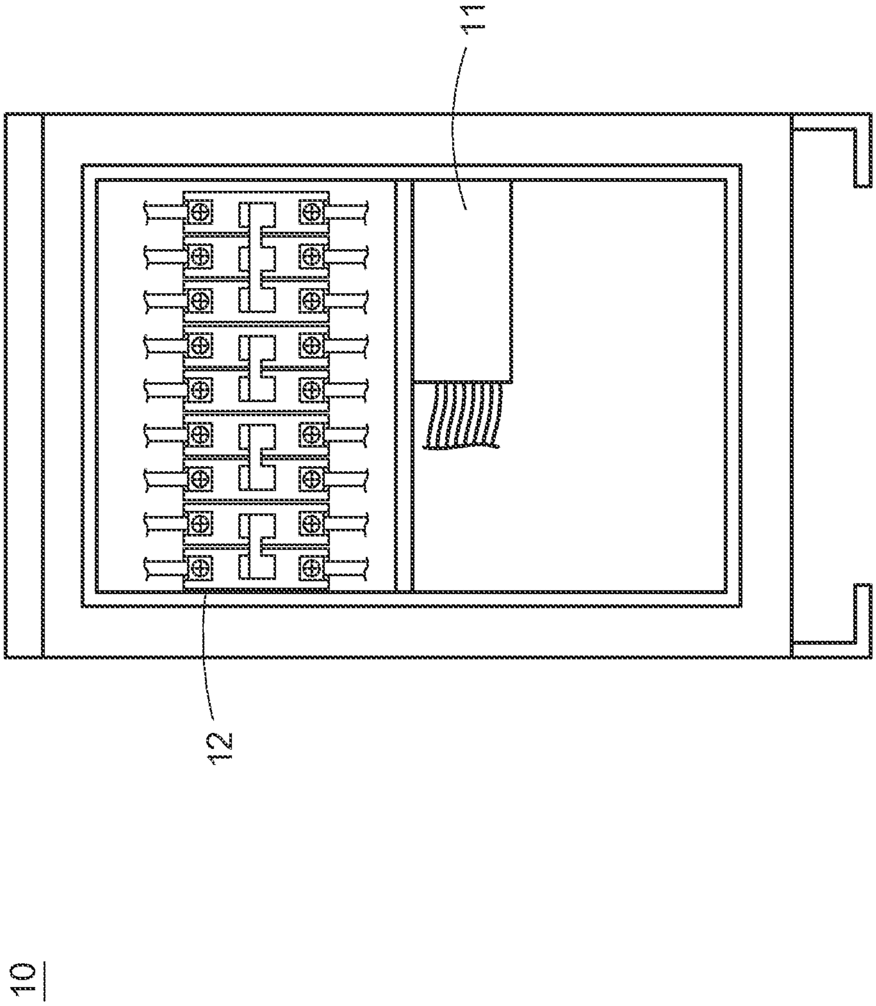
FIG. 1 is a schematic plan view of a distribution box of a power supply system according to the present disclosure.

Reference will now be made to the drawing figures to describe the present disclosure in detail. It will be understood that the drawing figures and exemplified embodiments of present disclosure are not limited to the details thereof.

The power supply system disclosed in the present disclosure may be applied, for example but not limited to, to power distribution systems of residences, businesses, or medical institutions, as a power supply requirement for high power output.

Please refer to FIG. 1, which shows a schematic plan view of a distribution box of a power supply system according to the present disclosure. The distribution box 10 may also be called a switch box or a switchboard, and is a device related to power supply.

The distribution box 10 is used to assemble switch and circuit breaker equipment, measuring instruments, protective appliances, and auxiliary equipment on the screen panel of the metal cabinet, and is a complete set of equipment for centralized installation of switches, instruments, and other equipment. The distribution box 10 shown in FIG. 1 at least includes a power delivery charging apparatus 11 and a no-fuse breaker 12. The power delivery charging apparatus 11 includes at least a circuit or a device for AC/DC power conversion. The distribution box 10 is an AC distribution box for receiving a three-phase 220-volt AC mains or a three-phase 380-volt AC mains supplied by a power company (electricity company), and the power delivery charging apparatus 11 converts the AC mains into a DC power.

Figure 2:
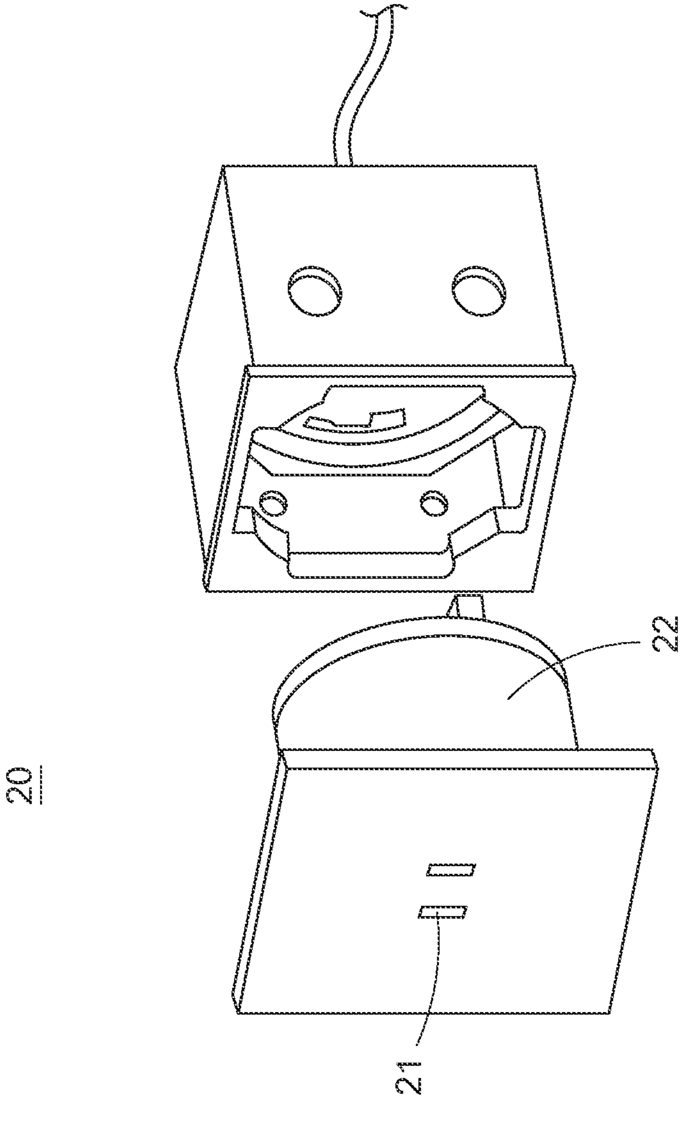
FIG. 2 is a three-dimensional schematic view of a charging socket of the power supply system according to the present disclosure.

Please refer to FIG. 2, which shows a three-dimensional schematic view of a charging socket of the power supply system according to the present disclosure. The charging socket shown in FIG. 2 is an embedded USB charging socket. In particular, since the charging socket 20 supports the power delivery (PD) function, the charging socket 20 includes a USB socket 21, which can realize the PD fast charging function through a Type-C transmission charging cable. In addition, the charging socket 20 further includes a DC/DC module 22 for converting the DC power required by the electronic product plugged into the USB socket 21 for fast charging of the electronic product.

Figure 3:
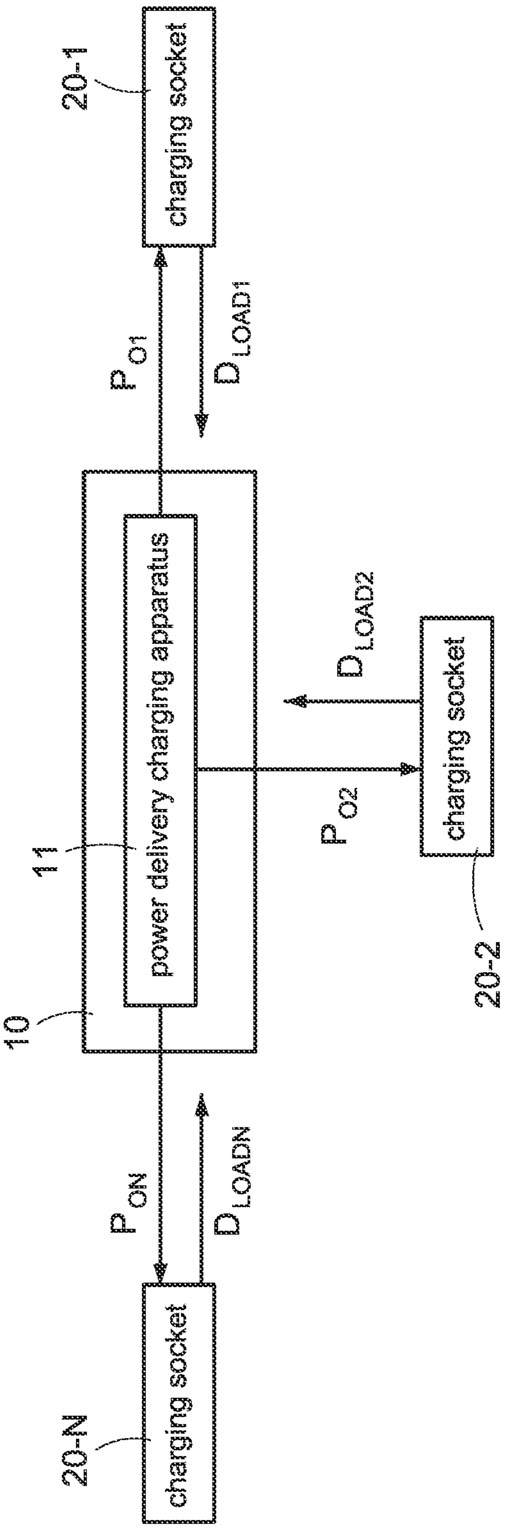
FIG. 3 is a block diagram of the power supply system according to the present disclosure.

Please refer to FIG. 3, which shows a block diagram of the power supply system according to the present disclosure. The power supply system includes a distribution box 10 and a plurality of charging sockets 20-1, 20-2, . . . , 20-N. The distribution box 10 shown in FIG. 3 may correspond to that shown in FIG. 1. The distribution box 10 includes a power delivery charging apparatus 11, that is, the power delivery charging apparatus 11 may be disposed in the distribution box 10. In the application of the present disclosure, the distribution box 10 is installed in a building, and the charging sockets 20-1, 20-2, . . . , 20-N are respectively installed in different spaces in the building, for example but not limited to, living rooms, kitchens, bedrooms, studies, and so on. Moreover, the distribution box 10 is connected to the charging sockets 20-1, 20-2, . . . , 20-N through wire arrangement. Therefore, the distribution box 10 supplies power to the charging sockets 20-1, 20-2, . . . , 20-N installed in living rooms, kitchens, bedrooms, and studies, so that users can use the charging sockets 20-1, 20-2, . . . , 20-N in their residential space to charge their household electronic products (that is, corresponding to the load 30 mentioned later). The same application concept may also be implemented in commercial office buildings or medical institutions, and the detail description is omitted here for conciseness.

In the present disclosure, each charging socket 20-1, 20-2, . . . , 20-N supports the function of power delivery (PD) so each charging socket 20-1, 20-2, . . . , 20-N can realize the PD fast charging function through the USB Type-C (hereinafter referred to as Type-C) transmission charging cable. The plurality of (N, where N is greater than or equal to 2) charging sockets 20-2, . . . , 20-N are electrically connected to the power delivery charging apparatus 11. Each the charging socket 20-1, 20-2, . . . , 20-N transmits the corresponding load power information $D_{LOAD1}$, $D_{LOAD2}$, . . . , $D_{LOADN}$ to the power delivery charging apparatus 11, which means that the first charging socket 20-1 transmits the first load power information $D_{LOAD1}$ to the power delivery charging apparatus 11, the second charging socket 20-2 transmits the second load power information $D_{LOAD2}$ to the power delivery charging apparatus 11, and so on, and the Nth charging socket 20-N transmits the Nth load power information $D_{LOADN}$ to the power delivery charging apparatus 11. Therefore, the power delivery charging apparatus 11 provides the corresponding DC power $P_{O1}$, $P_{O2}$, . . . , $P_{ON}$ to the charging sockets 20-1, 20-2, . . . , 20-N according to the load power information $D_{LOAD1}$, $D_{LOAD2}$, . . . , $D_{LOADN}$ respectively, that is, the power delivery charging apparatus 11 provides the first DC power $P_{O1}$ to the first charging socket 20-1 according to the received first load power information $D_{LOAD1}$, the power delivery charging apparatus 11 provides the second DC power $P_{O2}$ to the second charging socket 20-2 according to the received second load power information $D_{LOAD2}$, and so on, and the power delivery charging apparatus 11 provides the Nth DC power $P_{ON}$ to the Nth charging socket 20-N according to the received Nth load power information $D_{LOADN}$. The operations of the power delivery charging apparatus 11 and the plurality of charging sockets 20-1, 20-2, . . . , 20-N will be described in detail later.

Figure 4:
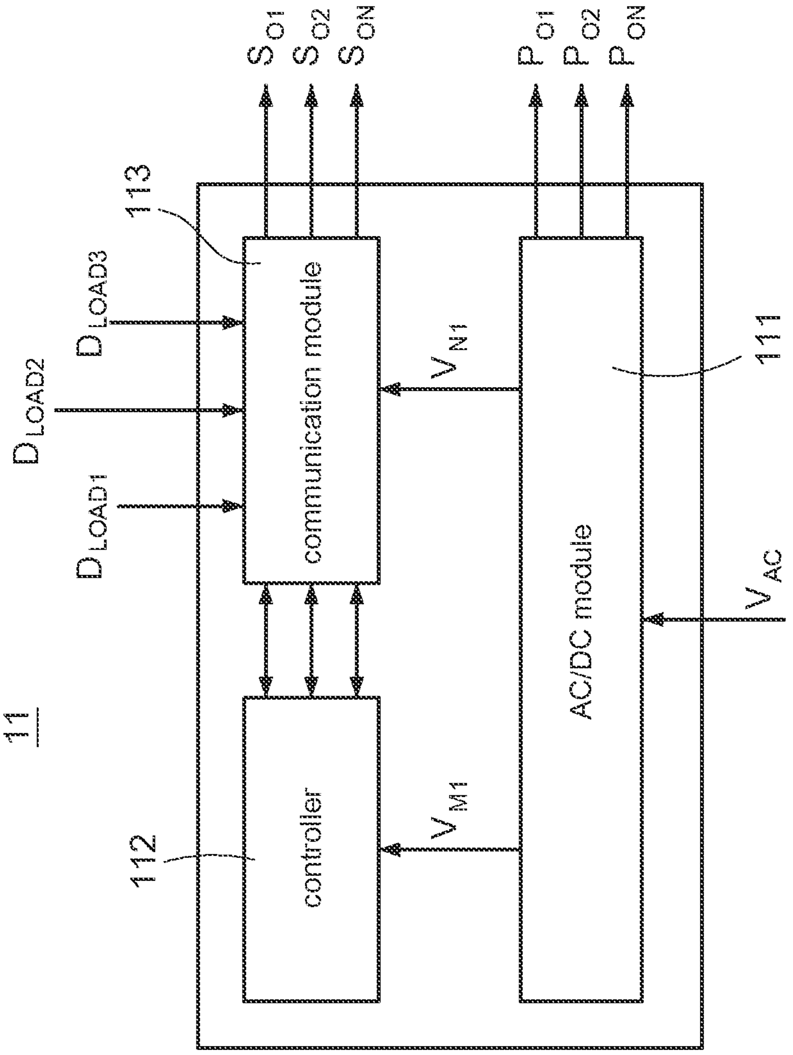
FIG. 4 is a block diagram of a power delivery charging apparatus according to the present disclosure.

Please refer to FIG. 4, which shows a block diagram of a power delivery charging apparatus according to the present disclosure. The power delivery charging apparatus 11 shown in FIG. 4 includes an AC/DC module 111, a controller 112, and a communication module 113. The AC/DC module 111 receives an AC mains $V_{AC}$ and converts the AC mains $V_{AC}$ into DC power $P_{O1}$, $P_{O2}$, . . . , $P_{ON}$, and provides the DC power $P_{O1}$, $P_{O2}$, . . . , $P_{ON}$ to the charging sockets 20-1, 20-2, . . . , 20-N. Specifically, the distribution box 10 is an AC distribution box for receiving the three-phase 220-volt or three-phase 380-volt AC mains $V_{AC}$ supplied by a power company (electricity company), and the AC/DC module 111 converts the received AC mains $V_{AC}$ into DC power $P_{O1}$, $P_{O2}$, . . . , $P_{ON}$, and the converted DC power $P_{O1}$, $P_{O2}$, . . . , $P_{ON}$ is provided to the charging sockets 20-1, 20-2, . . . , 20-N so that the charging sockets 20-2, . . . , 20-N can provide charging power.

The power delivery charging apparatus 11 receives the load power information $D_{LOAD1}$, $D_{LOAD2}$, . . . , $D_{LOADN}$ correspondingly provided by the charging sockets 20-1, 20-2, . . . , 20-N through the communication module 113, and converts the load power information $D_{LOAD1}$, $D_{LOAD2}$, . . . , $D_{LOADN}$ into corresponding control signals $S_{O1}$, $S_{O2}$, . . . , $S_{ON}$, that is, the controller 112 converts the first load power information $D_{LOAD1}$ into the first control signal $S_{O1}$, the controller 112 converts the second load power information $D_{LOAD2}$ into the second control signal $S_{O2}$, and so on, and the controller 112 converts the Nth load power information $D_{LOADN}$ into the Nth control signal $S_{ON}$.

The communication module 113 of the power delivery charging apparatus 11 receives the control signals $S_{O1}$, $S_{O2}$, . . . , $S_{ON}$ provided by the controller 112, and transmits the control signals $S_{O1}$, $S_{O2}$, . . . , $S_{ON}$ to the corresponding charging sockets 20-1, 20-2, . . . , 20-N, that is, the communication module 113 transmits the first control signal $S_{O1}$ to a communication circuit of the first charging socket 20-1, the communication module 113 transmits the second control signal $S_{O2}$ to a communication circuit of the second charging socket 20-2, and so on, and the communication module 113 transmits the Nth control signal $S_{ON}$ to a communication circuit of the Nth charging socket 20-N. In different embodiments, the communication module 113 transmits the control signals $S_{O1}$, $S_{O2}$, . . . , $S_{ON}$ to the communication circuits of the corresponding charging sockets 20-1, 20-2, . . . , 20-N by means of wired communication or wireless communication. In particular, the manner of the wired communication refers to the connection between the communication module 113 and the charging sockets 20-1, 20-2, . . . , with physical wires (such as but not limited to twisted pair, coaxial cable, optical fiber, etc.) so that the communication module 113 transmits the control signals $S_{O1}$, $S_{O2}$, . . . , $S_{ON}$ to the communication circuits of the corresponding charging sockets 20-1, 20-2, . . . , 20-N through the physical wires. In particular, the manner of the wireless communication is that the communication module 113 uses electromagnetic waves to transmit the control signals $S_{O1}$, $S_{O2}$, . . . , $S_{ON}$ to the communication circuits of the corresponding charging sockets 20-1, 20-2, . . . , 20-N in free space so as to communicate with these charging sockets 20-1, 20-2, . . . , 20-N.

Incidentally, since the controller 112 and the communication module 113 of the power delivery charging apparatus 11 need power to maintain normal and stable operation, the required power source may be AC mains $V_{AC}$. That is, the AC/DC module 111 can be used to convert the AC mains $V_{AC}$ into a control power $V_{M1}$, and provide the control power $V_{M1}$ to the controller 112 as the required power. Similarly, the AC/DC module 111 can be used to convert the AC mains $V_{AC}$ into a first communication power $V_{N1}$, and provide the first communication power $V_{N1}$ to the communication module 113 as the required power.

Figure 5:
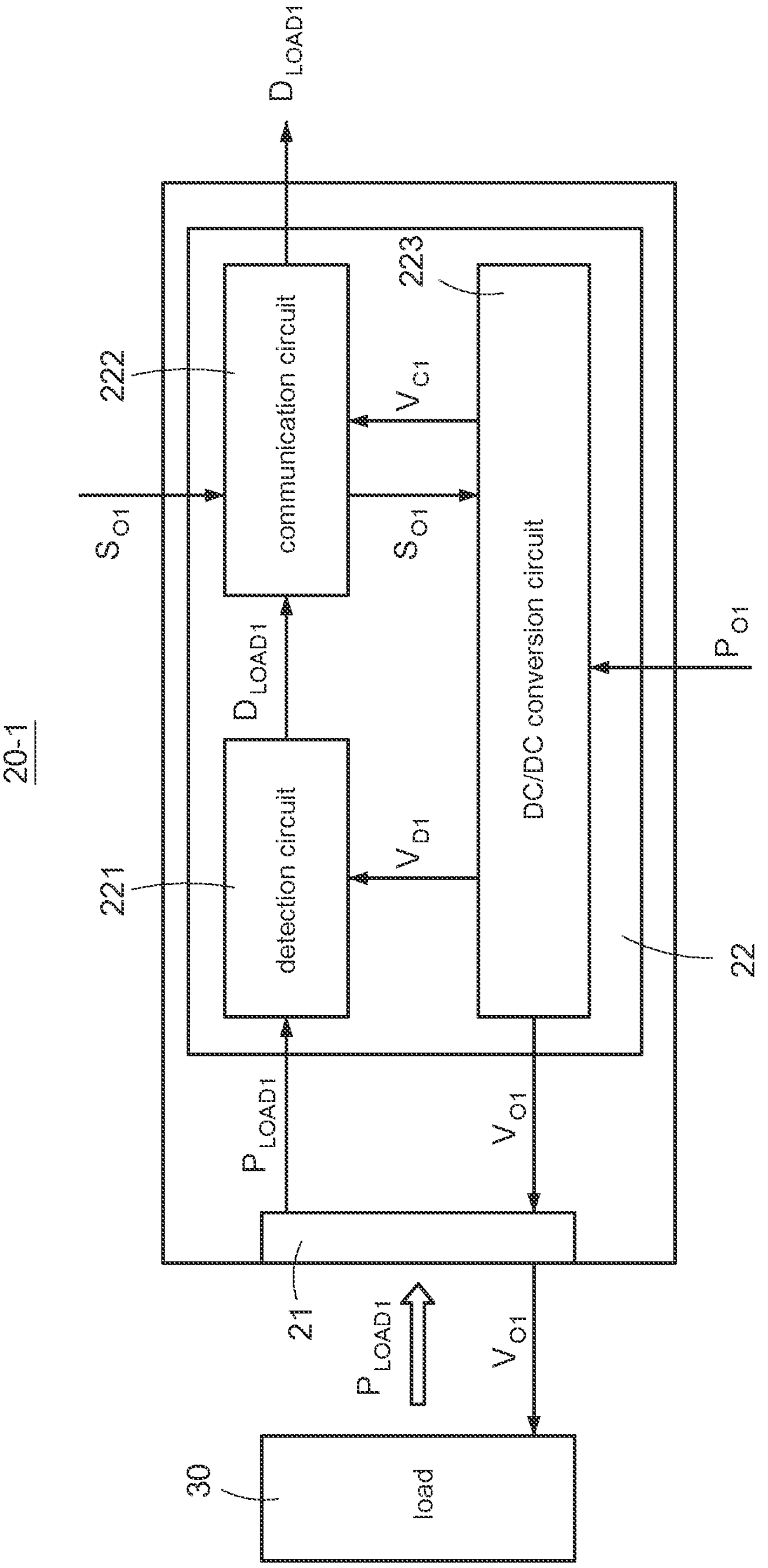
FIG. 5 is a block diagram of the charging socket according to the present disclosure.

Please refer to FIG. 5, which shows a block diagram of the charging socket according to the present disclosure. The charging socket 20 shown in FIG. 5 is described as the first charging socket 20-1, and the other charging sockets 20-2 . . . 20-N operate in the same way, and the schematic charging socket 20 may correspond to that shown in FIG. 2. The charging socket 20-1 includes a USB socket 21 and a DC/DC module 22.

The USB socket 21 is used to connected to the load 30, and receive a load power $P_{LOAD1}$. In particular, the load power $P_{LOAD1}$ is the information of voltage, current or power. That is, when the load 30 is plugged into the USB socket 21, the power demand of the load 30 to be supplied (charged) is provided to the first charging socket 20-1 by the load power $P_{LOAD1}$ in the form of voltage, current or power. Since the USB socket 21 is a socket with a USB Type-C format, the load 30 also has a connection port (end) corresponding to the USB Type-C format, and therefore the load 30 is plugged into the USB socket 21 for charging by the first charging socket 20-1.

The DC/DC module 22 receives the load power $P_{LOAD1}$ provided by the load 30, and transmits the load power information $D_{LOAD1}$ corresponding to the load power $P_{LOAD1}$ to the power delivery charging apparatus 11. As shown in FIG. 5, the DC/DC module 22 includes a detection circuit 221, a communication circuit 222, and a DC/DC conversion circuit 223.

The detection circuit 221 receives the load power $P_{LOAD1}$, and converts the load power $P_{LOAD1}$ into the load power information $D_{LOAD1}$. For example, without limiting the present disclosure: the detection circuit 221 receives the load power $P_{LOAD1}$ provided by the load 30 through the USB socket 21, for example a voltage between 5 and 48 volts, which means the power demand for the load 30 to be supplied (charged). After the detection circuit 221 receives and detects the voltage, the detection circuit 221 converts the voltage into a voltage signal with a smaller voltage value. That is, the detection circuit 221 converts the load power $P_{LOAD1}$ of 5 to 48 volts into the load power information $D_{LOAD1}$, which is a voltage signal of, for example but not limited to, 0.2 to 2 volts. In other words, when the detection circuit 221 receives the load power information $D_{LOAD1}$ of 2 volts, it means that the power requirement for the load 30 to be supplied (charged) is 48 volts; similarly, when the detection circuit 221 receives the load power information $D_{LOAD1}$ of 0.2 volts, it means that the power requirement for the load 30 to be supplied (charged) is 5 volts, and so on.

The communication circuit 222 receives the load power information $D_{LOAD1}$, and converts the load power information $D_{LOAD1}$ to the power delivery charging apparatus 11. Similarly, the communication circuit 222 transmits the load power information $D_{LOAD1}$ to the communication module 113 of the power delivery charging apparatus 11 in the form of wired communication (through physical wires) or wireless communication (through electromagnetic waves in free space) so as to communicate with the power delivery charging apparatus 11.

The DC/DC conversion circuit 223 receives the DC power $P_{O1}$ and to be supplied power, and receives the control signal $S_{O1}$ transmitted by the communication module 113 of the power delivery charging apparatus 11 through the communication circuit 222. The DC/DC conversion circuit 223 converts the DC power $P_{O1}$ into an output power $V_{O1}$ according to the control signal $S_{O1}$ corresponding to the load power information $D_{LOAD1}$ to provide the power required by the load 30. That is, the DC/DC conversion circuit 223 receives the DC power $P_{O1}$ acquired by converting the AC mains $V_{AC}$ through the AC/DC module 111, and converts the DC power $P_{O1}$ into the output $V_{O1}$ required by the load 30 to supply power to the load according to the control signal $S_{O1}$ (corresponding to the load power information $D_{LOAD1}$) provided by the power delivery charging apparatus 11. In particular, the output power $V_{O1}$ is a DC voltage, and the DC voltage is 5 volts, 9 volts, 15 volts, 20 volts, 28 volts, 36 volts, or 48 volts.

Incidentally, since the detection circuit 221 and the communication circuit 222 of the DC/DC module 22 need power to maintain normal and stable operation, the required power source may be AC mains $V_{AC}$. That is, the AC/DC module 111 can be used to convert the AC mains $V_{AC}$ into the DC power $P_{O1}$, $P_{O2}$, . . . , $P_{ON}$, and then the DC/DC conversion circuit 223 converts the DC power $P_{O1}$ into a detection power $V_{D1}$, and provides the detection power $V_{D1}$ to the detection circuit 221 as the required power. Similarly, DC/DC conversion circuit 223 can be used to convert the DC power $P_{O1}$ into a second communication power $V_{C1}$, and provide the second communication power $V_{C1}$ to the communication circuit 222 as the required power.

In summary, the present disclosure has the following features and advantages:

1. The power supply system of the present disclosure is a power supply system that can provide high-power output, which can not only meet the charging of electronic products with low power requirements, but also realize the charging of electronic products with high power requirements. Therefore, the embedded USB charging socket with limited volume can be widely used on various electronic products.

2. Each of the charging sockets 20-1, 20-2, . . . , 20-N of the present disclosure supports the power delivery (PD) function, and can realize the PD fast charging function through the Type-C transmission charging cable.

3. In the present disclosure, the AC/DC module with large electromagnetic interference is independently arranged in the distribution box, and the DC/DC module with small electromagnetic interference is arranged at the charging socket end so as to effectively solve the application fields with strict requirements on electromagnetic wave interference, such as medical institutions.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A power supply system, comprising:

a distribution box installed in a building, comprising:

a power delivery charging apparatus comprising an AC/DC module, the AC/DC module configured to receive an AC mains and convert the AC mains into a DC power, a plurality of charging sockets respectively installed in different spaces in the building, and electrically connected to the power delivery charging apparatus through wire arrangement, wherein each charging socket comprises a DC/DC module, the DC/DC module is configured to receive a load power and transmit a load power information corresponding to the load power to the power delivery charging apparatus, and the power delivery charging apparatus is configured to provide the DC power to the charging socket according to the load power information.

2. The power supply system as claimed in claim 1, wherein the power delivery charging apparatus comprises:

the AC/DC module, configured to provide the DC power to the charging socket, a communication module, configured to receive the load power information, and transmit the load power information to a controller, and the controller, configured to receive the load power information, and convert the load power information into corresponding control signals to the communication module, and the communication module configured to transmit the control signals to the corresponding charging sockets.

3. The power supply system as claimed in claim 2, wherein the AC/DC module is configured to convert the AC mains into a control power to provide the power required by the controller.

4. The power supply system as claimed in claim 2, wherein the AC/DC module is configured to convert the AC mains into a first communication power to provide the power required by the communication module.

5. The power supply system as claimed in claim 2, wherein the communication module transmits the control signals to the corresponding charging sockets by means of wired communication or wireless communication.

6. The power supply system as claimed in claim 1, wherein each charging socket supports the power transmission function.

7. The power supply system as claimed in claim 1, wherein each charging socket comprises:

a USB socket, configured to connect to a load, and receive the load power corresponding to the load power information provided by the load, and the DC/DC module.

8. The power supply system as claimed in claim 7, wherein the DC/DC module comprises:

a detection circuit, configured to receive the load power, and convert the load power into the load power information, a communication circuit, configured to receive the load power information and a control signal transmitted by the power delivery charging apparatus, and transmit the load power information to the power delivery charging apparatus, and a DC/DC conversion circuit, configured to receive the DC power and to be supplied power, and convert the DC power into an output power according to the control signal to provide the power required by the load.

9. The power supply system as claimed in claim 7, wherein the load power is a voltage, a current, or a power.

10. The power supply system as claimed in claim 8, wherein the output power is a DC voltage, and the DC voltage is 5 volts, 9 volts, 15 volts, 20 volts, 28 volts, 36 volts, or 48 volts.

* * * * *